Sept. 16, 1941.	E. SALANI	2,255,819
PROJECTOR
Filed Dec. 8, 1937	3 Sheets-Sheet 1

INVENTOR
Ettore Salani,
BY O.P.Wolhaupter
ATTORNEY

Sept. 16, 1941.                 E. SALANI                    2,255,819
                                PROJECTOR
                           Filed Dec. 8, 1937          3 Sheets-Sheet 2

INVENTOR
Ettore Salani,
BY D. P. Wolhaupter
ATTORNEY

Sept. 16, 1941.　　　E. SALANI　　　2,255,819
PROJECTOR
Filed Dec. 8, 1937　　　3 Sheets-Sheet 3

INVENTOR
Ettore Salani,
BY O.P. Wolhaupter
ATTORNEY

Patented Sept. 16, 1941

2,255,819

UNITED STATES PATENT OFFICE 2,255,819

PROJECTOR

Ettore Salani, Rome, Italy, assignor of one-half to Vitaliano Passardi, Rome, Italy Application December 8, 1937, Serial No. 178,789
In Italy January 9, 1937

1 Claim. (Cl. 240—41.36)

There are already well known projectors composed of a plurality of reflecting elements juxtaposed in such a manner as to form, as a whole, for example a projector having the general shape of a parabolic or spherical body of revolution. Projectors of this type do not always produce a result different from that obtained by a parabolic or spherical projector formed in one piece, and the fact that the reflecting surfaces are composed of a plurality of elements of small dimensions does not constitute a constructional advantage enabling the cost of production of projectors of large dimensions to be reduced.

In practice a projector is generally required to produce a luminous beam corresponding to the purpose for which it is adapted, that is to say, having a given angle of spread, the light being distributed as uniformly as possible throughout the entire beam. Projectors usually used have, in general, the shape of a parabolic body of revolution.

When a projector is required for a special purpose, for example for illuminating a building or an extended area, such as a landing field for aircraft, it is necessary to adapt it very exactly to this purpose so as to obtain the desired effect, in the first case by producing different luminous intensities on the various parts of the buildings, according to their nature, and in the second case so as to obtain a uniform distribution of the light over the whole of the illuminated surface.

For the purpose of obtaining this result it has hitherto been usual to employ separately or in groups projectors with parabolic reflectors having a curvature which more or less concentrates the reflected rays, or even projectors of any suitable shape which are combined with refracting elements located in the path of the projected beam. The effect obtained by these means is either the formation of a more or less open cone occasionally approaching the shape of a cylinder, or the diffusion in the form of a fan in a single plane. In any case with these means it has not been possible to adapt the projected light with sufficient precision to the nature of the object to be illuminated and especially when using refracting elements, the cost of production is no longer in proportion with the effect obtained. On the other hand known projectors, as a rule, require the employment of very strong luminous sources for obtaining the desired effect.

The present invention has for its subject a projector for eliminating the disadvantages above referred to. It comprises a single luminous source and is composed of a plurality of similar reflecting elements which are juxtaposed and are constituted by portions of bodies of general cylindrical shape, the dimensions of each element and its position relatively to the adjacent elements being determined by the luminous intensity desired in the different sectors of the projected luminous beam, which intensity is obtained by superposition in the same zone of rays reflected by a plurality of elements.

Various forms of construction of the subject of the invention are illustrated diagrammatically by way of example, in the accompanying drawings, wherein Figs. 1 to 6 show detail views.

Figure 1:
Figure 2:
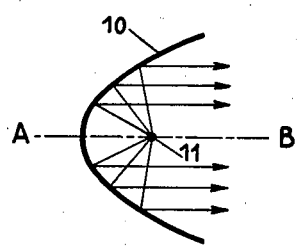
Figure 3:
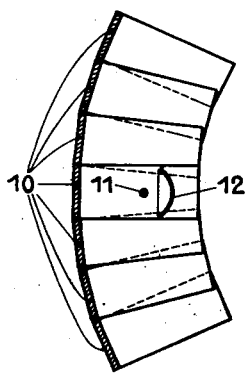

Referring to the drawings, Fig. 1 shows a band 10 of flat reflecting material such as, for example, polished metal, or a mirror, as is used for forming the elements constituting the projector according to the invention. Fig. 2 shows an element 10 bent in the form of a parabola symmetrically about an axis A—B. Fig. 3 shows the manner in which a plurality of the elements 10 are juxtaposed so as to form a reflector provided with a single luminous source 11, in front of which there is located a small spherical reflector 12.

Figure 4:
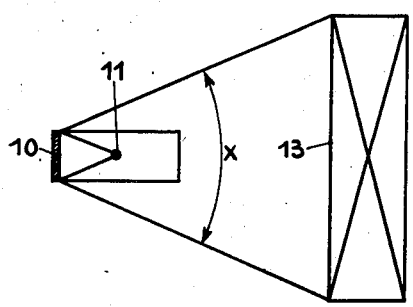

Fig. 4 shows the manner in which the luminous rays emanating from the luminous source 11 are reflected horizontally by the central element of the projector.

It will be seen that, according to the width of the element 10 and according to the position of the luminous source 11 relatively to this element, the angle of reflection X is larger or smaller and that there is obtained a more or less large illuminated surface 13, the height of this surface being adjusted, in the case of a parabolic reflector such as that shown in Fig. 2, by the curvature of the reflector.

By the selection of the width of the elements 10 and their degree of curvature means are available for adapting the projector to a special illumination to which it is adapted.

Figure 5:
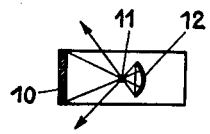

Fig. 5 shows how the small reflector 12 returns the rays emanating from the luminous source 11.

This reflector 12 is, in practice, made of such a shape that no direct or reflected ray can escape without impinging on one of the reflecting elements 10.

Figure 6:
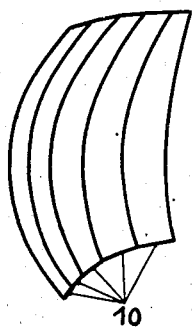

Fig. 6 shows in perspective a projector composed of five reflecting elements 10.

Bearing in mind the above observations it is possible to assemble at will, projectors adapted to all special illuminations and also to adjust at will the luminous intensity of each zone of the reflected beam.

Figure 7:
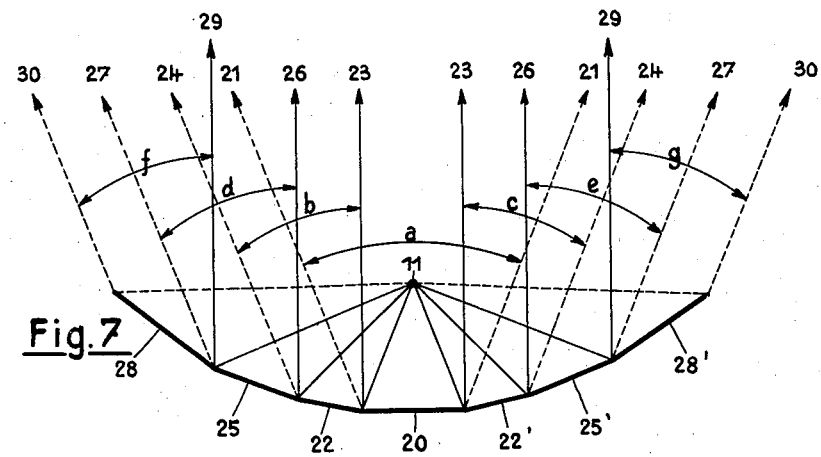
Fig. 7 shows the arrangement of the elements of a reflector according to a first form of construction.

Fig. 7 shows the arrangement of reflecting elements of a reflector adapted to produce uniform illumination.

Firstly there is selected the width of the central element 20 in such a manner as to obtain an angle $a$ of the desired size between the outer reflected rays 21. There are then placed on opposite sides of the element 20, elements 22 and 22' of such a width, different in this instance, and so inclined relatively to the central element that the ray 23 reflected by the inner edge of each of the elements 22 and 22' is parallel to the plane of symmetry of the reflector and that the ray 24 reflected by the outer edge thereof is parallel to the ray 21 of the central element 20. The angles $b$ and $c$ subtended by the inner and outer rays reflected by the elements 22 and 22' respectively are equal.

The succeeding elements 25, 25' and 28, 28' are dimensioned and placed relatively to one another and relatively to the preceding elements according to the same principle, that is to say, that their width and relative inclination are selected in such a manner that the rays 26 and 29 respectively reflected by their inner edges are parallel to the plane of symmetry of the reflector and that the rays 27 and 30 respectively reflected by their outer edges are parallel to the rays 21. The angles $d, e, f, g$ subtended by the inner and outer reflected rays of each pair of elements 25, 25' and 28, 28' are equal.

From the foregoing description it will be seen that the luminous beams of the elements 22, 25, 28 and 22', 25', 28', located on opposite sides of the central element 20, are superposed on one another on each half of the beam reflected by the central element 20.

Figure 8:
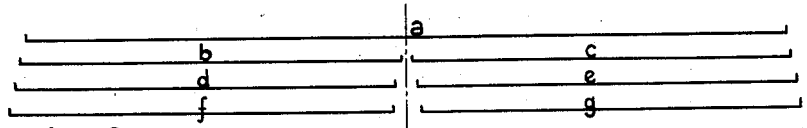
Fig. 8 shows the superposition of projections from different elements.

Fig. 8 shows a diagram of the superposition of the beams of the different elements on a surface illuminated by the projector.

Assuming that the beam of the central element 20 illuminates a surface of a width $a$ corresponding to the angle $a$ between the outer rays reflected by this element, then it will be seen from Fig. 7 that on opposite sides of the central plane of the surface $a$, the elements 22, 25 and 28 superpose their reflected beams on surfaces $b, d, f$ and the elements 22', 25', 28' on the surfaces $c, e, g$, each corresponding with the angle between the outer and inner rays reflected by these elements.

Theoretically, and as shown in Fig. 8, the reflected beam for each element is slightly displaced towards the outside by a value corresponding approximately to the width of the element, but this is absolutely imperceptible in practice by reason of the proportion between the width of the elements, which is calculated in centimetres, and the length of the projected beam, which is calculated in hundreds of meters or kilometres.

In the case described there is thus obtained an illumination of the surface $a$ by the superposition of four luminous beams.

Figure 9:
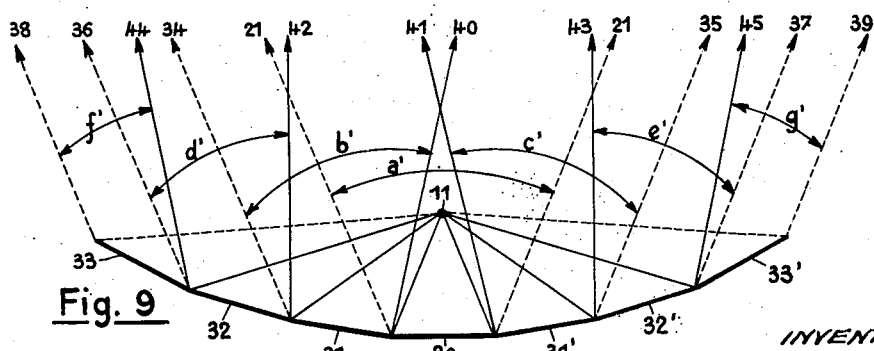

Fig. 9 shows another embodiment enabling approximately the same result to be obtained.

In this case the central element 20 is identical with that in Fig. 7 and the outer rays 21 reflected thereby subtend an angle $a'$.

The elements 31, 32, 33 and 31', 32', 33' respectively located on opposite sides of the element 20 are all of the same dimensions in this instance. Their relative positions are selected in such a manner that all the rays reflected by their outer edges are parallel to the outer rays 21 of the central element. It thus follows that the angles $b'$ and $c'$ between the inner reflected rays 40 and 41, and the outer rays 34 and 35 of the elements 31 and 31' respectively are equal to one another but smaller than $a'$. The same also applies to the angles, $d'$ between the rays 36 and 42 of the element 32, $e'$ between 37 and 43 of the element 32', $f'$ between the rays 38 and 44 of the element 33, and $g'$ between 39 and 45 of the element 33'.

Figure 10:
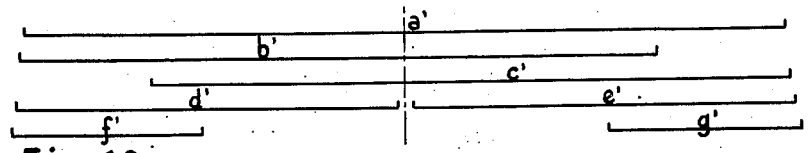
Figs. 9 and 10 are views similar to Figs. 7 and 8 of a second form of construction.

Fig. 10 shows diagrammatically the superposition of the luminous rays of the different elements reflected upon a surface illuminated by the projector.

The central element 20 illuminates a surface of a width $a'$, the elements 31 and 31' respectively illuminate surfaces $b'$ and $c'$ of a width corresponding with the angles between their inner and outer reflected rays. The elements 32 and 32' illuminate surfaces $d'$ and $e'$ and the elements 33 and 33' surfaces $f'$ and $g'$.

It will thus be seen that with this arrangement of elements, which are identical in dimensions, it is possible to obtain an effect substantially similar to that obtained by the device shown in Fig. 7.

From the two examples shown in Figs. 7 and 9 it will be seen that irrespective of the distance at which the projector is to act, the whole of the light emanating from the luminous source is utilised, as the outer rays reflected by each reflecting element are parallel and that the rays reflected by the inner edges are parallel to the plane of symmetry of the projector or in any case do not pass beyond the angle subtended by the outer rays of the central element.

It will be understood that the applications of the principle above described may be varied to infinity and that a projector constructed in accordance with the present invention can be adapted to any special illumination by distributing at will the light emanating from a single source in the reflected luminous beam.

In practice any loss of light by direct dispersion is prevented by so locating the small spherical reflector 12, in front of the luminous source that it reflects all the light on the reflecting elements constituting the projector. In this manner the luminous beam leaving the projector only comprises reflected rays.

From Figs. 7 and 9 of the drawing it will be seen that for reflecting all the rays of the luminous source 11 on to the reflecting elements of the projector, the small reflector, which is not shown in these figures, normally placed in front of this source should embrace an angle of more than 180°, which is disadvantageous, particularly in view of its cooling.

Figure 11:
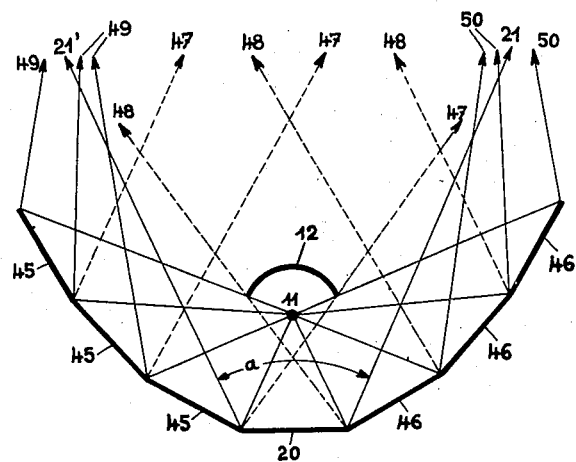
Figs. 11 and 12 show the arrangements of the reflecting elements in two other forms of construction.

For remedying this disadvantage and for obtaining projectors with a smaller opening than those above described it is possible to provide for a crossing of the luminous projected beams as is shown in Fig. 11, that it to say, the elements 45, placed for example on the left hand side of the central element 20, project their beams into the right hand portion of the beam of the projector, and reversely the right hand elements 46 project their rays into the left hand portion of this beam. From the drawing it will be seen that the rays 47 reflected by the elements 45 cross the rays 48 reflected by the elements 46. The relative position of the different reflected elements of the projector may also be selected in such a manner that the rays reflected by the inner edges of the elements located on one side of the central element 20 are parallel to the outer rays projected by the outer edge of the other half of the central element. Consequently the rays 47 projected by the inner edges of the elements 45 are parallel to the rays 21 reflected by the right hand outer edge of the element 20, while the rays 48 reflected by the inner edges of the elements 46 are parallel to the rays 21' reflected by the left hand outer edge of the element 20. The width of the elements in this case is preferably so selected that the angle between the rays 47 and 48 reflected by their inner edges and the rays 49 and 50 reflected by their outer edges is smaller than the angle $a$ between the rays reflected by the outer edges of the central element.

By the provision of reflecting elements as above described projectors are obtained with a smaller opening or less diffusion as the inclination of the lateral projecting elements 45 and 46 relatively to the central element 20 is greater and the reflector 12 placed in front of the luminous source 11 may then embrace an angle less than 180°, for example 120°, which is more advantageous, especially as regards its cooling.

Figure 12:
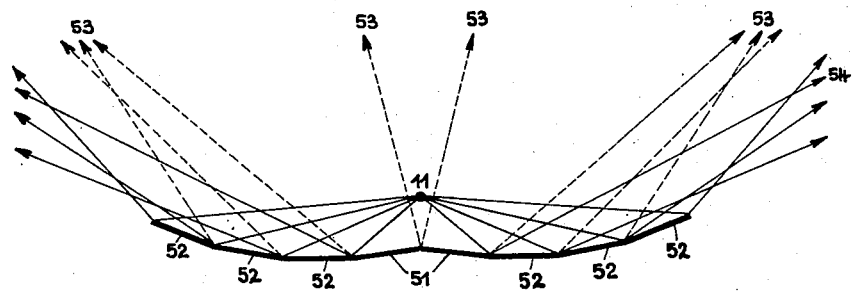

Fig. 12 shows another arrangement of the reflecting elements enabling a larger quantity or greater diffusion of light to be passed into the edges of the projected luminous beam than into the central portion thereof.

In this case the projector is provided with two central elements 51 located on opposite sides of its plane of symmetry or focal axis and slightly inclined relatively to one another. On the two sides of these central elements 51 are placed elements 52. In this figure the rays reflected by the inner edges of each element are indicated by 53 and those reflected by the outer edges by 54. It will be readily seen from the drawing that the major portion of the reflected rays is passed towards the left and right of the central portion of the projected luminous beam.

The foregoing examples show that the projector forming the subject of the present invention enables the luminous rays emanating from a single source of light to be distributed at will into the reflected beam, according to the effect desired, solely by the selection of the dimensions and the relative arrangement of the reflecting elements.

It will be appreciated that the reflecting elements constituting a reflector in accordance with the invention may be mounted on movable supports enabling their relative positions to be modified by any suitable mechanical means, whereby the opening angle of the reflected beam may be modified in width. A modification of this character may also be obtained by moving the luminous source. In this case the opening angle of the projected beam is modified both in width and in height.

Instead of constructing the reflecting elements with a parabolic curvature as above described, the curvature may for example be circular, elliptical and so forth.

It will also be understood from the foregoing description that it is possible to illuminate in a practically uniform manner surfaces of which certain points nearer to the projector appear more clearly in a beam projected by an ordinary reflector.

The arrangement of the reflecting elements may take place relatively to a central element or relatively to a plane of symmetry passing through the luminous source.

In the case of elements arranged relatively to a plane of symmetry passing through the luminous source, the position of the reflecting elements is adjusted in such a manner that the rays projected by one of their edges are parallel to those projected by the outer edge of one of the two central elements, located on opposite sides of the plane of symmetry, and that the angle subtended by the rays projected by their two edges is smaller or equal to that subtended between the rays reflected by the outer edges of the two central elements.

It will also be understood that according to the purpose in view the reflecting elements may also be arranged asymmetrically. The curvature of the elements may naturally be other than parabolic, for example circular or elliptical.

I claim:

In a reflecting system for producing a substantially evenly illuminated field and comprising a composite reflector having a plane of symmetry and being constituted of a plurality of relatively long and narrow reflecting elements formed as parts of approximately cylindrical surfaces and having substantially the same length, a point source of light situated in said plane, a central reflecting element mounted symmetrically with reference to said plane of symmetry and having a wide angle of reflection bounded by limiting rays which diverge from its outer edges outwardly with reference to said plane and substantially define said field, and a plurality of pairs of auxiliary lateral reflecting elements mounted respectively symmetrically with respect to said plane and forming optically a substantially continuous reflecting surface with said central reflecting element with the long edges of said elements being adjacent, each said auxiliary element being constructed and oriented with reference to said plane so that it delivers a beam of light bounded on one side by an inner extreme ray extending from the inner edge of said auxiliary element substantially parallel to said plane of symmetry and on the other side bounded by an outer extreme ray extending substantially parallel to the nearest extreme ray of said central element, whereby the beams reflected from said auxiliary elements on a first side of said plane of symmetry illuminate only the portion of said field on said first side of said plane, and the beams reflected from said auxiliary elements on the second side of said plane illuminate only the portion of said field on the second side of said plane, and the beam reflected from said central element is superposed in desired manner on the beams reflected by said auxiliary elements.

ETTORE SALANI.